(12) United States Patent
Du et al.

(10) Patent No.: US 11,544,526 B2
(45) Date of Patent: Jan. 3, 2023

(54) COMPUTING DEVICE AND METHOD (71) Applicant: Shanghai Cambricon Information Technology Co., Ltd., Pudong New Area (CN)

(72) Inventors: Zidong Du, Pudong New Area (CN); Shaoli Liu, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 474 days.

(21) Appl. No.: 16/698,991

(22) Filed: Nov. 28, 2019

(65) Prior Publication Data

US 2020/0097796 A1 Mar. 26, 2020

Related U.S. Application Data

(63) Continuation of application No. 16/698,976, filed on Nov. 28, 2019, which is a continuation-in-part of (Continued)

(30) Foreign Application Priority Data

Jun. 26, 2017 (CN) .......................... 201710495795.1

(51) Int. Cl.
*G06N 3/04* (2006.01)
*G06F 1/3296* (2019.01)
(Continued)

(52) U.S. Cl.
CPC ......... *G06N 3/0418* (2013.01); *G06F 1/3296* (2013.01); *G06F 8/65* (2013.01);
(Continued)

(58) Field of Classification Search
CPC ...... G06N 3/0418; G06N 3/08; G06N 3/0454; G06N 3/0481; G06N 3/084; G06N 3/063;
(Continued)

(56) References Cited

U.S. PATENT DOCUMENTS

| 10,528,818 B1* | 1/2020 | Rao ......................... G06V 20/52 |
| 2013/0046803 A1* | 2/2013 | Parmar .................. H04N 1/644 |
| | | 708/401 |

(Continued)

FOREIGN PATENT DOCUMENTS

| CN | 1838031 A | 9/2006 |
| CN | 101854526 A | 10/2010 |

(Continued)

OTHER PUBLICATIONS

CN 201710441977.0, Official Action dated Apr. 7, 2020, 8 pages.
(Continued)

*Primary Examiner* — Farley Abad
(74) *Attorney, Agent, or Firm* — Getech Law LLC; Jun Ye (57) ABSTRACT

A computing device, comprising: a computing module, comprising one or more computing units; and a control module, comprising a computing control unit, and used for controlling shutdown of the computing unit of the computing module according to a determining condition. Also provided is a computing method. The computing device and method have the advantages of low power consumption and high flexibility, and can be combined with the upgrading mode of software, thereby further increasing the computing speed, reducing the computing amount, and reducing the computing power consumption of an accelerator.

16 Claims, 3 Drawing Sheets

Related U.S. Application Data application No. PCT/CN2018/090901, filed on Jun. 12, 2018.

(51) Int. Cl.
    *G06F 8/65*         (2018.01)
    *G06F 9/30*         (2018.01)
    *G06F 9/38*         (2018.01)
    *G06N 3/08*         (2006.01)

(52) U.S. Cl.
CPC ........ *G06F 9/30036* (2013.01); *G06F 9/3877* (2013.01); *G06N 3/08* (2013.01); *G06F 2209/5011* (2013.01)

(58) Field of Classification Search
CPC ...... G06F 1/3296; G06F 8/65; G06F 9/30036; G06F 9/3877; G06F 2209/5011; G06F 17/16; G06F 17/14
See application file for complete search history.

(56) References Cited

U.S. PATENT DOCUMENTS

| | | | | |
|---|---|---|---|---|
| 2014/0095129 | A1* | 4/2014 | Liu | G06F 30/20 703/2 |
| 2017/0132496 | A1* | 5/2017 | Shoaib | G06K 9/6268 |

FOREIGN PATENT DOCUMENTS

| | | |
|---|---|---|
| CN | 104539263 A | 4/2015 |
| CN | 105320495 A | 2/2016 |
| CN | 105512723 A | 4/2016 |
| CN | 106779068 A | 5/2017 |
| CN | 106796668 A | 5/2017 |
| CN | 109086880 A | 12/2018 |

OTHER PUBLICATIONS

Shijin ZHANG, et al. "Cambricon-X: An Accelerator for Sparse Neural Networks"; 49th Annual IEEE/ACM International Symposium on Microarchitecture; University of Chinese Academy of Sciences, Beijing, China; Dec. 15, 2016, 12 pages.
EP19217768.1, European Search Report dated Apr. 24, 2020, 9 pages.
Alham Fikri Aji et al., "Sparse Communication for Distributed Gradient Descent", arxiv.org, Cornell University Library, 201 Olin Library Cornell University Ithaca, NY 14853, Apr. 17, 2017, 6 pages.
Wei Wen et al., "TernGrad: Ternary Gradients to Reduce Communication in Distributed Deep Learning", arxiv.org, Cornell University Library, 201 Olin Library Cornell University Ithaca, NY 14853, May 22, 2017, 13 pages.
PCT/CN2018/090901—Search Report, dated Aug. 21, 2018, 9 pages.
CN 201710441977.0—Second Office Action, dated Sep. 15, 2020, 9 pages.
CN 201710473955.2—First Office Action, dated Mar. 2, 2020, 3 pages. (No English Translation).
CN 201710473955.2—Second Office Action, dated May 15, 2020, 3 pages. (No English Translation).
CN 201710473955.2—Third Office Action, dated Aug. 24, 2020, 4 pages. (No English Translation).
CN 201710474297.9—First Office Action, dated May 15, 2020, 3 pages, (No English Translation).
CN 201710474297.9—Second Office Action, dated Nov. 12, 2020, 9 pages, (No English Translation).
CN 201710483182.6—First Office Action, dated Apr. 29, 2020, 9 pages, (No English Translation).
CN 201710495795.1—First Office Action, dated Dec. 30, 2019, 3 pages, (No English Translation).
CN 201710495795.1—Second Office Action, dated Mar. 25, 2020, 4 pages, (No English Translation).
PCT/CN2018/090901—International Search Report, dated Aug. 27, 2018, 10 pages, (No English translation).
EP 18818258.8—Response to the Invitation to File Search Results Pursuant to Rule 70b(1) EPC dated Feb. 4, 2021, filed Feb. 18, 2021, 8 pages.
EP 18818258.8—Extended European Search Report, dated Jul. 21, 2020, 9 pages.
EP 18818258.8—Response to Extended European Search Report dated Jul. 21, 2020, dated Jan. 26, 2021, 14 pages.
Zhang, et al., "Power Optimization in Multipliers Using Multi-Precision Combined with Voltage Scaling Techniques", IEEE 1st Int'l Symposium on Quality Electronic Design—Asia, 2009, 4 pages.
Fayed, et al., "A Novel Architecture for Low-Power Design of Parallel Multipliers", Proceedings IEEE Computer Society Workshop on VLSI 2001. Emerging Technologies for VLSI Systems, 2001, pp. 149-154.
EP 19217768.1—Response to Extended European Search Report dated Apr. 24, 2020, dated Nov. 25, 2020, 11 pages.
EP 19217768.1—Response to Extended European Search Report dated Dec. 3, 2020, dated Jan. 29, 2021, 3 pages.

\* cited by examiner

COMPUTING DEVICE AND METHOD

TECHNICAL FIELD

The disclosure relates to the field of artificial intelligence, and specifically relates to an operation device and method that can accelerate neural network operations.

BACKGROUND

Neural network algorithms have become the most advanced algorithms in many different fields such as image recognition, speech recognition, and natural language processing, where the most important of these is deep learning. Neural networks perform different operations through neurons of different layers to process input data, and finally obtain corresponding output results. In general, forward operations of a neural network exist during the process of training and testing, thus, the efficiency of forward operations is of great importance for the entire neural network. Furthermore, convolution operations are very important for a neural network, which usually have a large amount of operation and therefore cause large overhead. For instance, in a convolutional neural network, the operation of a convolutional layer accounts for more than 80% of the operating time of the entire network.

However, when implementing the present disclosure, a major technical problem of the existing technology has been found: a neural network may fail to complete forward operations, and particularly convolution operations, rapidly.

SUMMARY

In order to solve the problem or partially mitigate the problem, the present disclosure provides an operation device and method that can accelerate neural network operations. By converting operations into another space (the space here refers to the geometric space in mathematics) for performing operation, the operation device and method can accelerate neural network operations such as convolution operations, which can help to complete the operations of an entire network rapidly.

The present disclosure provides an operation device, where the operation device may include:
a transformation module configured to perform spatial transformation on input data and/or a parameter matrix from first geometric space into second geometric space; and
an operation module connected to the transformation module, and may be configured to receive transformed input data and parameter matrix and then perform operations.

In an example of the disclosure, input data and a parameter matrix may be presented by employing a linear combination of a basis vector of a second geometric space through spatial transformation. In other words, the input data and the parameter matrix may be expanded in the second geometric space.

In an example of the disclosure, the input data and the parameter matrix may be input data and a parameter matrix used by a convolutional layer, a down-sampling layer, a normalization layer, or a regularization layer.

In an example of the disclosure, the first geometric space may be a spatial domain, and the second geometric space may be a frequency domain.

In an example of the disclosure, the manner of the spatial transformation may be an invertible spatial transformation including FFT, DFT, DCT or DST.

As an alternative example, the operation module may include:
a multiplier configured to multiply input data to obtain an output; and/or
one or more adders configured to add input data to obtain an output.

Alternatively, the plurality of adders may form an adder tree that is configured to perform adder tree operations, which in other words, refers to that the adder tree may be configured to add input data level by level to obtain output data.

As an alternative example, the operation module may further include:
an activation function unit configured to perform activation function operations on input data which are input into the activation function unit to obtain activated output data, where the activation function may include sigmoid, tanh, ReLU, or softmax.

As an alternative example, the operation module may further include:
a pooling unit configured to perform pooling operations on input data which are input into the pooling unit to obtain output data after pooling, where the pooling operations may include: mean-pooling, max-pooling, or median-pooling.

As an alternative example, the operation device may further include:
a storage module configured to store data and instructions; and
a control module configured to control the operation module to perform corresponding operations.

As an alternative example, the storage module may include: a weight caching unit, an input neuron caching unit, an output neuron caching unit, and an instruction caching unit.

As an alternative example, the operation device may further include:
optimization module configured to perform optimization operation on transformed input data and/or parameter matrices, where the optimization operation may include component selecting, quantifying, sparsification, or compressing.

As an alternative example, the optimization module may perform a component selection according to a component selection condition through PCA (Principal component analysis).

Alternatively, the component selection condition may include:
a threshold condition, which in other words, means that with a given threshold, if the absolute value of the coefficient of a component is greater than the threshold, the component may be retained; otherwise, if the absolute value of the coefficient of a component is less than the threshold, the component may be deleted; or
a quantity condition, which in other words, means that with a given quantity for selection, components that satisfy the quantity are selected according to a descending order of coefficients of the components.

The present disclosure provides an operation method, where the operation method may include:
performing spatial transformation on input data and/or a parameter matrix from first geometric space to second geometric space; and
performing operations on the transformed input data and parameter matrix.

In an example of the disclosure, input data or parameter matrix may be presented by employing a linear combination of a basis vector of a second geometric space through spatial transformation. In other words, the input data and parameter matrix may be expanded in the second geometric space.

In an example of the disclosure, the input data and the parameter matrix may be input data and a parameter matrix used by a convolutional layer, a down-sampling layer, a normalization layer, or a regularization layer.

In an example of the disclosure, the first geometric space may be a spatial domain, and the second geometric space may be a frequency domain.

In an example of the disclosure, the manner of the spatial transformation may be an invertible spatial transformation including FFT, DFT, DCT or DST.

As an alternative example, the performing operations on the transformed input data and parameter matrices may include:

obtaining the linear combination representation of the parameter matrices in the second geometric space according to the obtained transformed parameter matrices, which in other words, refers to that the parameter matrices may be represented by a linear combination of the space basis vector of the second geometric space; and coupling and operating the spatially transformed input data and the space basis vector As an alternative example, before the performing operations on the transformed input data and parameter matrices, the method may further include:

performing optimization operations on input data and/or parameter matrices in the transformation space, where the optimization operation may include at least one of the following: component selecting, quantifying, sparsification, or compressing.

As an alternative example, the optimization operation is performing a component selection according to a component selection condition through PCA.

Alternatively, the component selection condition may include:

a threshold condition, which in other words, refers to that with a given threshold, if the absolute value of a coefficient of a component is greater than the threshold, the component may be retained; otherwise, if the absolute value of the coefficient of a component is less than the threshold, the component may be deleted; or a quantity condition, which in other words, refers to that with a given quantity for selection, components that satisfy the quantity may be selected according to the descending order of the coefficients of the components.

As an alternative example, the performing operations on the transformed input data and parameter matrices may include: multiplication, addition, multiply-add operations, inner product operations, non-linear operations, or convolution operations.

As an alternative example, the performing operations on the transformed input data and parameter matrices may further include: activation function operations or pooling operations.

The operation device and method described above may have the following technical effects:

(1) transferring operations of a neural network to another space for operating by decomposing the operations of the neural network, which may thus accelerate the speed of the initial neural network by performing a limited quantity of operations in another space.

(2) transferring data of a neural network to another space, which may thus reduce an amount of data in the neural network and cut down storage overhead.

(3) optimizing a parameter matrix and input data in a transformation space, which may thus further reduce the overhead and accelerate the operation speed.

DETAILED DESCRIPTION

The present disclosure is explained more fully hereinafter with reference to specific examples and the accompanying drawings to facilitate a better understanding of the purposes, technical schemes and advantages of the disclosure.

It should be noted that in the description of the drawings or the specification, reference is made to the drawings, and the same reference numbers used designate the same or similar parts. The implementations that are not illustrated or described in the drawings are well-known to persons having ordinary skill in the art of the disclosure. Also, it should further be noted that, though instances including the parameters of specific values are provided herein, the parameters need not exactly equal the corresponding values. Instead, the parameters may approximates the corresponding values within an acceptable error tolerance or a design constraint. In addition, the location words used in the examples hereinafter, such as "up", "down", "front", "back", "left", "right", and the like, merely indicate the location in the reference drawings. Thereby, the location words used are not intended to limit the disclosure.

Unless otherwise defined, all technical and scientific terms used herein have the same meaning as commonly understood by persons having ordinary skill in the art of the disclosure. The terms used in the specification of the disclosure are merely for the purpose of describing specific examples and are not intended to limit the disclosure. The phrase "and/or" used herein refers to the random and all combinations of one or a plurality of related items listed.

Figure 1:
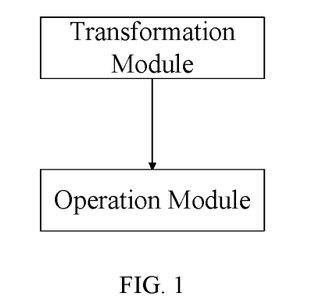
FIG. 1 is a structural diagram of an operation device in an example of the disclosure.

FIG. 1 is a structural diagram of an operation device provided in an example of the disclosure. The operation device may include:

a transformation module configured to perform spatial transformation on input data and/or parameter matrices from first geometric space into second geometric space; and an operation module connected to the transformation module and may be configured to receive transformed input data and parameter matrices and perform operations. Alternatively, input of the operation device may include images, videos, audio, texts, and the like. Output of the operation device may be numerical output, and the output represents, but is not limited to, a classification result, a generation result, and the like.

As an alternative example, input data and parameter matrices may be represented by a linear combination of a second geometric space basis vector, which in other words, refers to that input data and parameter matrices may be expanded in the second geometric space.

As an alternative example, the input data and the parameter matrices may be input data and parameter matrices used by a convolutional layer, a down-sampling layer, a normalization layer, or a regularization layer.

As an alternative example, the first geometric space may be a spatial domain, and the second geometric space may be a frequency domain.

As an alternative example, the manner of the spatial transformation may be an invertible spatial transformation, including FFT, DFT, DCT, or DST.

As an alternative example, the operation module of the operation device may include: a multiplier configured to multiply input data to obtain an output; and/or one or more adders configured to add input data to obtain an output.

Alternatively, the plurality of adders may form an adder tree configured to perform adder tree operations, which in other words, refers to that the adder tree may be configured to add input data level by level to obtain output data.

As an alternative example, the operation module of the operation device may further include: an activation function unit configured to perform activation function operations on input data which is input into the activation function unit to obtain activated output data, where the activation function may include sigmoid, tanh, ReLU, or softmax.

As an alternative example, the operation module of the operation device may further include: a pooling unit configured to perform pooling operations on input data which is input into the pooling unit to obtain output data after being pooled; the pooling operation may include: mean-pooling, max-pooling, or median-pooling.

As an alternative example, the operation device may further include: a storage module configured to store data and instructions; and a control module configured to control the operation module to perform corresponding operations.

As an alternative example, the storage module of the operation device may include: a weight caching unit, an input neuron caching unit, an output neuron caching unit, and an instruction caching unit.

As an alternative example, the operation device may further include: optimization module configured to perform optimization operations on transformed input data and/or parameter matrices, where the optimization operation may include component selecting, quantifying, sparsification, or compressing.

As an alternative example, the optimization module of the operation device may perform a component selection according to a component selection condition through PCA (Principal component analysis). Alternatively, the component selection condition may include a threshold condition, which in other words, means that with a given threshold, if the absolute value of the coefficient of a component is greater than the threshold, the component may be retained; otherwise, if the absolute value of the coefficient of a component is less than the threshold, the component may be deleted; or a quantity condition, which in other words, means that with a given quantity for selection, components that satisfy the quantity may be selected according to the descending order of the coefficients of the components.

Figure 2:
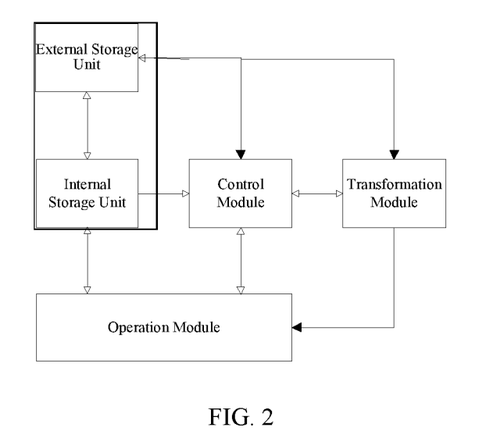
FIG. 2 is a structural diagram of an operation device in an example of the disclosure.

FIG. 2 is a structural diagram of an operation device in an example of the disclosure. The operation device may include: a transformation module that may be configured to perform spatial transformation on input data and/or parameter matrices from first geometric space into second geometric space; and an operation module connected to the transformation module, and may be configured to receive transformed input data and parameter matrices and perform operations. The operation device further may include an external storage unit, an internal storage unit, and a control module.

The external storage unit may be configured to store part or all data information of the operation module, the internal storage unit, and the control module. The data information may include: weight data, neuron data (including input), instruction data, transformation information, and the like. The external storage unit can further provide a read/write interface for external memories, and can be configured with a related register to flexibly realize operations on different external memories.

The internal storage unit may be configured to store data for the operation module, including weights, neurons (including input), instruction data, and the like. The internal storage unit can further provide a read/write interface for external storage modules to realize data exchange between an internal storage module and an external storage module.

The control module may provide an interface for exchanging of control signals with the external storage module, and may be used for receiving and analyzing external control signals to control other modules; the control module may also provide a signal exchange interface for the operation module, and may be used for controlling operation signals to complete different operations. The control module may further provide a single exchange interface for the transformation module, and may be used for sending signals to the transformation module to control the transformation function. Input data and parameter matrices that are transformed by the transformation module may be directly sent to the operation module for operating, or may be sent to the operation module for operating via the external and internal storage modules.

Alternatively, input of the operation device may include images, videos, audio, texts, and the like. Output of the operation device may be numerical output, where the output represents, but is not limited to, classification result and generation result.

As an alternative example, operations performed by the operation module in the operation device may include neural network operations.

Alternatively, the operation module may include: a multiplier configured to multiply input data to obtain an output; and/or one or a plurality of adders configured to add input data to obtain an output. Further, the plurality of adders may form an adder tree configured to perform adder tree operations, which in other words, refers to that the adder tree may be configured to add input data level by level to obtain output data.

As an alternative example, the operation module may include, but is not limited to: a first multiplier section, a second adder tree section, a third activation function unit section, and/or a fourth pooling unit section. The first multiplier section may multiply input data 1 (in1) by input data 2 (in2) to obtain an output (out), and the process is as follows: out=in1*in2. The second adder tree section may add input data in1 level by level in the adder tree to obtain output data (out), where in1 is a vector with a length of N, N is greater than 1, and the process is as follows: out=in1

[1]+in1[2]+ ... +in1[N]; and/or, input data (in1) may be accumulated in the adder tree and then the accumulation result may be added with input data (in2) to obtain output data (out), and the process is as follows: out=in1[1]+in1[2]+ ... +in1[N]+in2; or input data (in1) may be added with input data (in2) to obtain output data (out), and the process is as follows: out=in1+in2. The third activation function unit section may perform activation function (active) operations on input data (in) to obtain an activated output data (out), and the process is as follow: out=active(in), where the activation function (active) may be sigmoid, tanh, relu, softmax, and the like; in addition to activation operations, the third activation function unit section may also be capable of realizing other non-linear functions, for instance, the third activation function unit section can perform operations (f) on input data (in) to obtain output data (out), and the process is as follows: out=f(in). The pooling unit may perform pooling operations on input data (in) to obtain output data (out) after being pooled, and the process is as follows: out=pool(in), where pool is a pooling operation, and the pooling operation may include, but is not limited to: mean-pooling, max-pooling, and median-pooling; and input data (in) is the data in a pooling kernel related to output data (out).

Correspondingly, the operation module performing operations may include: multiplying input data 1 by input data 2 by the first multiplier section to obtain data; and/or performing adder tree operations by the second adder tree section to add input data 1 level by level through the adder tree, or to add input data 1 and input data 2 to obtain output data; and/or performing activation function operations by the third activation function unit section to perform activation function (active) operations on input data to obtain output data; and/or performing pooling operations by the fourth pooling unit section, where the process is out=pool(in), and pool represents a pooling operation that may include, but is not limited to: mean-pooling, max-pooling, median-pooling; input data in is the data in a pooling kernel related to output data out. The operations of one or more of the sections among the above-mentioned sections may be performed with different orders to realize operations of different functions.

Figure 3:
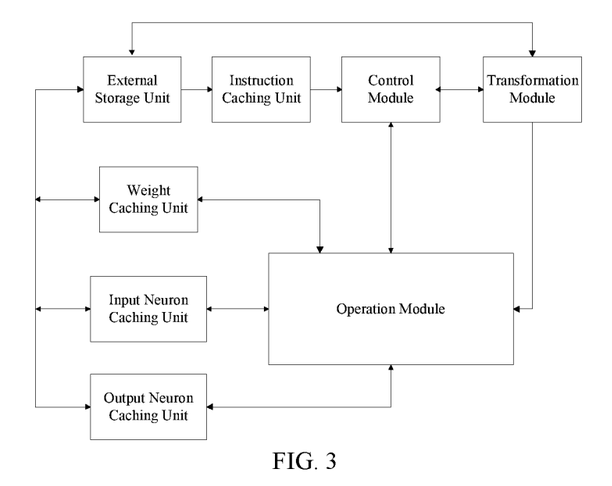
FIG. 3 is a structural diagram of an operation device in an example of the disclosure.

Moreover, referring to FIG. 3, the internal storage module of the operation device of the present disclosure may further include: an instruction caching unit, an input neuron caching unit, an output neuron caching unit, and a weight caching unit. The instruction caching unit may be configured to cache instructions; the weight caching unit may be configured to cache weight data; the input neuron caching unit may be configured to cache input neurons; the control module may further be configured to read instructions from the instruction caching unit, decode the instructions into instructions that can be performed by the operation module and then output to the operation module; and the output neuron caching unit may be configured to cache operations results output by the operation module, and transfer the operation results to the external storage module.

The disclosure provides an operation method including:
performing spatial transformation on input data and/or parameter matrices from first geometric space into second geometric space; and
performing operations on the transformed input data and parameter matrices.

As an alternative example, the representing input data or parameter matrices by employing a linear combination of the basis vector of the second geometric space through spatial transformation may refer to that, the input data and parameter matrices may be expanded in the second geometric space.

As an alternative example, the input data and the parameter matrices may be input data and parameter matrices used by a convolutional layer, a down-sampling layer, a normalization layer, or a regularization layer.

As an alternative example, the first geometric space may be a spatial domain, and the second geometric space may be a frequency domain.

As an alternative example, the manner of the spatial transformation may be an invertible spatial transformation, including FFT, DFT, DCT, or DST.

As an alternative example, the performing operations on the transformed input data and parameter matrices may include: obtaining the linear combination representation of the parameter matrices in the second geometric space according to the obtained transformed parameter matrices, which in other words, refers to that the parameter matrices may be represented by a linear combination of the space basis vector of the second geometric space; and coupling and operating the spatially transformed input data and the space basis vector.

As an alternative example, before the performing operations on the transformed input data and parameter matrices, the method may further include: performing optimization operations on input data and/or parameter matrices in the transformation space, where the optimization operation may include at least one of the following: component selecting, quantifying, sparsification, or compressing.

As an alternative example, the optimization operation is performing a component selection according to a component selection condition through PCA. Alternatively, the component selection condition may include a threshold condition, which in other words, refers to that with a given threshold, if the absolute value of the coefficient of a component is greater than the threshold, the component may be retained; otherwise, if the absolute value of the coefficient of a component is less than the threshold, the component may be deleted; or a quantity condition, which in other words, refers to that with a given quantity for selection, components that satisfy the quantity may be selected according to the descending order of the coefficients of the components.

As an alternative example, the performing operations on the transformed input data and parameter matrices may include: multiplication, addition, multiply-add operations, inner product operations, non-linear operations, or convolution operations.

As an alternative example, the performing operations on the transformed input data and parameter matrices may further include: activation function operations or pooling operations.

As an alternative example, the operation device may include an internal storage unit. Instructions stored in the internal storage unit can be used for completing training of an accelerated neural network or for testing operation. When the operation device processes data during a testing, the operation device can transfer input to the neural network to obtain a forward result through the operation module.

During a training process, an input may be repeatedly transferred to a neural network, the operation module may perform operations to obtain a forward result, and during the process, the forward operation result may be compared with a given reference result to obtain an error, then a gradient is operated and back propagated to an input terminal of the neural network, and neural network parameters may be updated during each forward process or every couple of forward processes.

Specifically, a forward operation process in the above-mentioned process may include:

S1, transferring input into the neural network;

S2, processing input data by a neural network layer through the operation module, where the processing process may include, but is not limited to convolution, down-sampling, normalization, regularization, and the like, and the corresponding layers are convolutional layer, down-sampling layer, normalization layer, and regularization layer;

S3, collecting output results and transferring the results.

Figure 4:
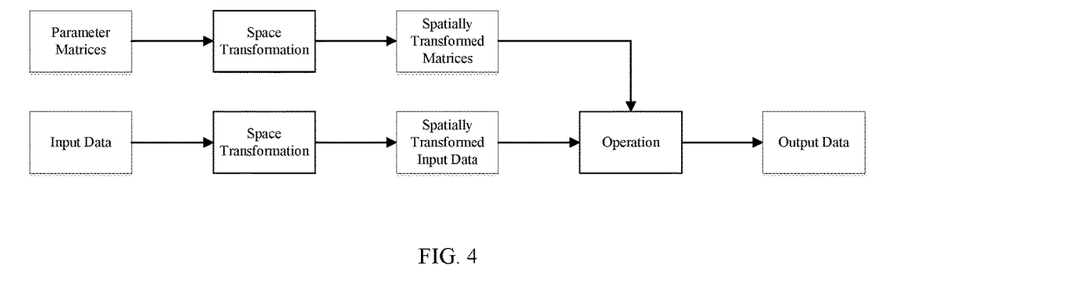
FIG. 4 is a diagram showing a process of an operation device in an example of the disclosure performing the operations of a layer.

FIG. 4 is a diagram showing a process of an operation device provided in an example of the disclosure performing operations of a layer. The process may include:

Step 1: performing spatial transformation on input data by transforming the input data from first geometric space to second geometric space. Specifically, the input data may be transformed from spatial domain to another geometric space, for instance, from a spatial domain to a frequency domain. A manner adopted for spatial transformation may be invertible space transformation, such as FFT (Fast Fourier Transform), DFT (Discrete Fourier Transform), DCT (Discrete Cosine Transform), DST (Discrete Sine Transform), and the like. Representing raw data by a linear combination of another geometric space basis vector, which in other words, refers to expanding the raw data in another geometric space. In a neural network operation, the input data may include neurons.

Step 2: performing spatial transformation on parameter matrices by transforming the parameter matrices from the first geometric space to the second geometric space. Specifically, the parameter matrices may be transformed from a spatial domain to another geometric space, for instance, from a spatial domain to a frequency domain. A manner adopted for spatial transformation may be invertible space transformation, such as FFT, DFT, DCT, DST, and the like. Representing raw data by a linear combination of another geometric space basis vector, which in other words, refers to expanding the raw data in another geometric space. This spatial transformation may be similar to the above-mentioned spatial transformation, in a neural network operation, the parameter matrices may include weights.

Obtaining an expression of the parameter matrices in the transformation space according to the transformed parameter matrices, which in other words, refers to representing the parameter matrices by using a mathematical expression in the transformation space.

Performing further operations on the transformation result and the transformed parameter matrices according to the transformation result of the input data obtained in Step 1, and obtaining an initial operation result corresponding to the input data.

Correspondingly, when using the above-mentioned operation device to perform convolution operations in a forward process, the following may be included:

Performing spatial transformation on input data by transforming the input data from a spatial domain to another space, for instance, a frequency domain. A manner adopted for spatial transformation may be invertible space transformation, such as DFT, DCT, and DST.

Performing spatial transformation on parameter matrices of the convolutional layer by transforming the parameter matrices from a spatial domain to another space, for instance, a frequency domain. The space may be the same as the space in the first step.

Obtaining a linear combination expression of the parameter matrices in the transformation space according to the transformed parameter matrices, which in other words, refers to representing the parameter matrices as a linear combination of the space basis vector of the transformation space.

Performing operations on the transformation result of the input data and the transformed parameter matrices (in other words, a linear combination expression of the parameter matrices) to obtain an initial convolution operation result corresponding to the input data according to the transformation result of the input data obtained in the first step, which in other words, refers to that the input data is expanded in the second geometric space and expressed by a linear combination expression of the second geometric space basis vector.

Figure 5:
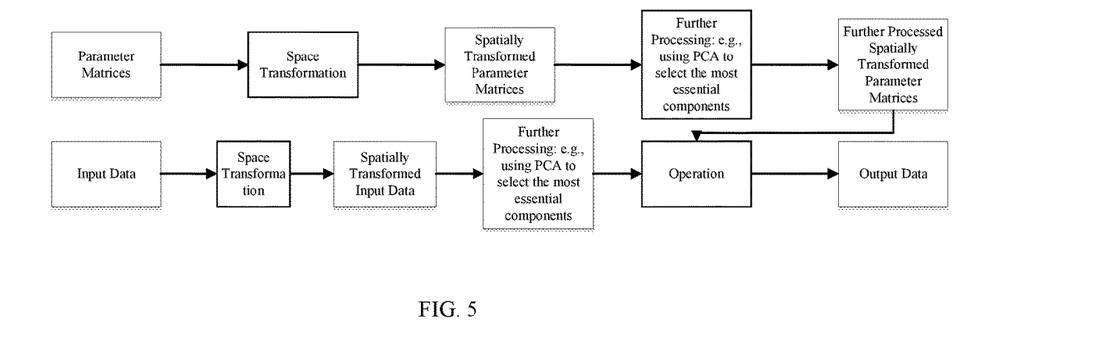
FIG. 5 is a diagram showing an operation module in an example of the disclosure performing neural network operations.

As an alternative example, as shown in FIG. 5, parameter matrices and input data may be further optimized in the transformation space. Optionally, optimization may be performed by analyzing components, and a further acceleration may thus be realized. Specifically, after input data and parameter matrices are spatially transformed, expressions of the input data and parameter matrices may include a plurality of components and corresponding coefficients of the components. A component selection may be performed according to a component selection condition through PCA to select some essential components, and other unessential components may be deleted. In addition, besides PCA, other customized analyses may be used for optimization. The component selection condition may include a threshold condition. For instance, with a given threshold, if the absolute value of the coefficient of a component is greater than the threshold, the component may be retained; otherwise, if the absolute value of the coefficient of a component is less than the threshold, the component may be deleted. The component selection condition may further include a quantity condition. For instance, with a given quantity for selection, components that satisfy the quantity may be selected according to the descending order of the coefficients of the components. The further optimization may be optional for both parameter matrices and input data. Other applicable further optimization may include, but is not limited to, quantifying, which in other words, refers to a process of approximating continuous values (or a large count of possible discrete values) of a signal as a limited plurality of (or a small count of) discrete values; sparsification; and compressing.

Figure 6:
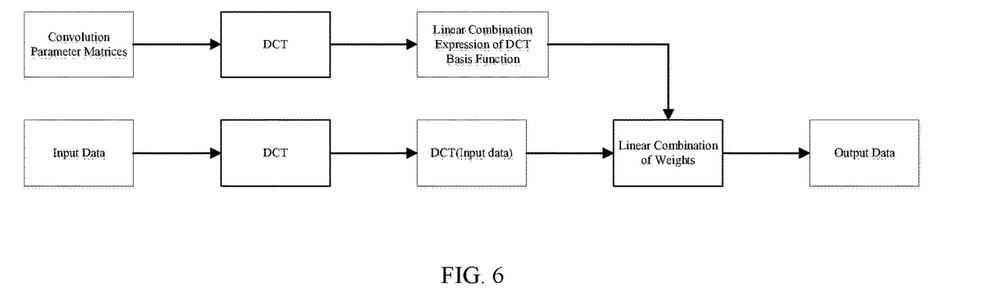
FIG. 6 is a diagram showing an operation module in an example of the disclosure performing convolution operations.

As an alternative example, as shown in FIG. 6, when an operation is a convolution operation, a spatial transformation manner adopted may be DCT. In this example, a convolution kernel and input data may not be further optimized in terms of a transformed spatial representation.

Figure 7:
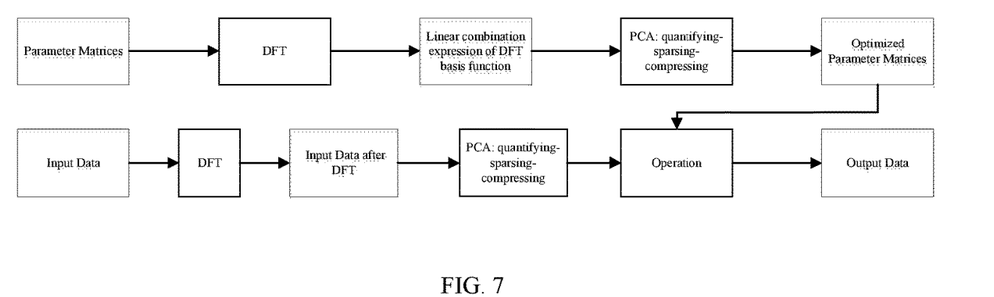
FIG. 7 is a diagram showing an operation module in an example of the disclosure performing convolution operations.

As an alternative example, as shown in FIG. 7, when an operation is a convolution operation, a spatial transformation manner adopted may be DFT. Optimization processing in the example may be: firstly, selecting essential space components through PCA to approximately express raw data, where data processed in this stage may include input data and weights, and then quantifying, sparsifying, and compressing the data to further reduce an amount of operations and an amount of data to be stored.

In some other examples, spatial transformation may be customized spatial transformation as long as it meets criteria of an invertible orthogonal transformation.

Alternatively, the operation device above can perform spatial transformation on matrices to be operated.

Alternatively, the transformation module of operation device may perform winograd transformation on neuron matrices and weight matrices to obtain transformed neuron matrices and transformed weight matrices.

Alternatively, the following formula may be used for performing winograd transformation on neuron matrix $d_0$ and weight matrix $w_0$, to obtain transformed neuron matrix d and transformed weight matrix w:

$$d=C^T d_0 C, w=G w_0 G^T,$$

where C represents a transformation matrix of the neuron matrix $d_0$, $C^T$ represents a transposition matrix of C, G represents a transformation matrix of the weight matrix $w_0$, and $G^T$ represents a transposition matrix of G.

Besides, numbers in neuron matrices and weight matrices may be binary, and numbers of the transformation matrices C and G may be $2^n$, for instance, 1, −0.5, 0, 0.5, 1, and the like. In this way, the present example of the disclosure may adopt bit manipulation to realize winograd transformation, where operations of multiplying by 2 and dividing by 2 may be realized by left shift and right shift. For instance, when a number in the neuron matrix $d_0$ is multiplied by 0.5, the number may be right shifted by one position; when a number in neuron matrix $d_0$ is multiplied by −0.5, the number may be left shifted by one position and a most significant digit may be negated. In this way, the present example of the disclosure may realize winograd transformation by bit manipulation, operation amount may thus be reduced, and operation speed may thus be improved.

The transformation matrices C and G of the neuron matrix $d_0$ and weight matrix $w_0$ may be obtained by using a winograd algorithm.

A winograd algorithm may use blocks of a matrix to perform multiplication so as to reduce matrix multiplication. There are a plurality of different manners to partition a matrix into blocks. A winograd algorithm is as follows:

performing matrix multiplication C=AB, and partitioning each matrices into blocks, then $$A = \begin{bmatrix} A_{11} & A_{12} \\ A_{21} & A_{22} \end{bmatrix}, B = \begin{bmatrix} B_{11} & B_{12} \\ B_{21} & B_{22} \end{bmatrix}, C == \begin{bmatrix} C_{11} & C_{12} \\ C_{21} & C_{22} \end{bmatrix}$$

noting down $$S_1=A_{21}+A_{22}, S_2=S_1-A_{11}, S_3=A_{11}-A_{21}, S_4=A_{12}-S_2$$

$$S_5=B_{12}-B_{11}, S_6=B_{22}-S_5, S_7=B_{22}-B_{12}, S_8=S_6-B_{21}$$

$$M_1=S_2 S_6, M_2=A_{11} B_{11}, M_3=A_{12} B_{21}, M_4=S_3 S_7$$

$$M_5=S_1 S_5, M_6=S_4 B_{22}, M_7=A_{22} S_8$$

$$T_1=M_1+M_2, T_2=T_1+M_4$$

then $$C_{11}=M_2+M_3+M_6, C_{12}=T_1+M_5$$

$$C_{21}=T_2-M_7, C_{22}=T_2+M_5$$

obtaining transformation matrix required by a convolution through the winograd algorithm, instance for, for an one-dimension convolution $[d_1,d_2,d_3]*[w_1,w_2]$, assuming that each convolution sliding is 1, then expanding the convolution into a form of matrix multiplication $$\begin{bmatrix} d_1, d_2 \\ d_2, d_3 \end{bmatrix} \begin{bmatrix} w_1 \\ w_2 \end{bmatrix} = \begin{bmatrix} \text{output}_1 \\ \text{output}_2 \end{bmatrix}$$

the following can be obtained through the winograd algorithm $$M_1=(-a_1+a_2+a_3)b_1, M_2=a_1 b_1, M_3=a_2 b_2, M_4=0$$

$$M_5=(a_2+a_3)(-b_1), M_6=0, M_7=a_3(b_1-b_2)$$

$$\text{output}_1=M_2+M_3+M_6, \text{output}_2=M_1+M_2+M_4-M_7$$

removing items whose value are 0 along with unused items, then rewriting the above as $$m_1=(-a_1+a_2+a_3)b_1, m_2=a_1 b_1, m_3=a_2 b_2, m_4=a_3(b_1-b_2)$$

$$\text{output}_1=m_2+m_3, \text{output}_2=m_1+m_2-m_4$$

in this way, a transformation matrix of the convolution can be obtained $$C = \begin{bmatrix} -1 & 1 & 0 & 0 \\ 1 & 0 & 1 & 0 \\ 1 & 0 & 0 & 1 \end{bmatrix}, G = \begin{bmatrix} 1 & 0 \\ 1 & 0 \\ 0 & 1 \\ 1 & -1 \end{bmatrix}, A = \begin{bmatrix} 0 & 1 \\ 1 & 1 \\ 1 & 0 \\ 0 & 1 \end{bmatrix}$$

For a high dimensional matrix, a convolution transformation matrix of the matrix may be obtained through a plurality times of matrix partitioning. A winograd algorithm may provide different manners for dividing a matrix into blocks. For the same manner of dividing a matrix into blocks, specific numbers and dimension of a transformation matrix may be determined according to dimensions of input neurons and a weight matrix as well as a convolution sliding stride.

The operation module of operation device in the foregoing example may be CPU, GPU, FPGA, DSP, and an ASIC dedicated accelerator.

Besides, it should be noted that a neural network of the present disclosure may include, but is not limited to a convolution neural network, and may also be a fully connected neural network, a Restricted Boltzmann Machine neural network, a Recurrent Neural Network, and the like.

As an alternative example, the operation device and method provided in any of the foregoing examples may be used for other operations in addition to a convolution operation, such as a fully connected operation.

The above-mentioned examples merely describe several implementations of the disclosure. It should be understood that the description of the examples, while being relatively specific and detailed, are not given by way of limitation on the scope of the disclosure. It should be noted that, those skilled in the art may make changes and modifications without departing from the disclosure in its broader aspects, which all fall within the scope of protection of the disclosure. Therefore, the protection scope of the disclosure should be subject to the protection scope of the claims.

What is claimed is:
1. An operation device comprising:
a transformation circuit configured to perform spatial transformation on input data and/or a parameter matrix from first geometric space into second geometric space; and an operation circuit connected to the transformation circuit and configured to receive transformed input data and parameter matrix, and then perform operations, wherein the operation device further includes an optimization circuit configured to perform optimization operation on transformed input data and/or a parameter matrix, wherein the optimization operation includes component selection, quantifying, sparsification, or compressing, wherein the optimization circuit performs component selection according to a component selection condition through a principal component analysis, and wherein the component selection condition includes:

a threshold condition that with a given threshold, if an absolute value of a coefficient of a component is greater than the threshold, the component is retained, otherwise, if an absolute value of a coefficient of a component is less than the threshold, the component is deleted, and a quantity condition that with a given quantity for selection, components that satisfy the quantity are selected according to a descending order of coefficients of the components.

2. The operation device of claim 1, wherein the input data and the parameter matrix are presented by a linear combination of a basis vector of the second geometric space through spatial transformation.

3. The operation device of claim 1, wherein the input data and the parameter matrix are input data and a parameter matrix used by a convolutional layer, a down-sampling layer, a normalization layer, or a regularization layer.

4. The operation device of claim 1, wherein the first geometric space is a spatial domain, and the second geometric space is a frequency domain, and wherein a manner of the spatial transformation is an invertible spatial transformation including FFT, DFT, DCT, or DST.

5. The operation device of claim 1, wherein the operation circuit includes:

a multiplier configured to multiply data that are input into the multiplier to obtain output after multiplication, and one or a plurality of adders configured to add data that are input into the adders to obtain output data, and wherein the operation circuit further includes an activation function circuit configured to perform activation function operations on data that are input into the activation function circuit to obtain activated output data, wherein an activation function includes sigmoid, tanh, ReLU, or softmax.

6. The operation device of claim 1, wherein the operation circuit further includes a pooling circuit configured to perform pooling operations on data that are input into the pooling circuit to obtain output data after pooling, wherein the pooling operations include: mean-pooling, max-pooling, or median-pooling, and wherein the operation device further includes:

a storage circuit configured to store data and instructions, and a control circuit configured to control the operation circuit to perform corresponding operations.

7. An operation method comprising:

performing spatial transformation on input data and/or a parameter matrix from first geometric space to second geometric space; and performing operations on transformed input data and parameter matrix, wherein prior to the performing operations on the transformed input data and parameter matrix, the method further includes:

performing optimization operations on the input data and/or the parameter matrix in transformation space, wherein the optimization operations include at least one of component selection, quantifying, sparsification, or compressing, wherein the optimization operations refer to performing component selection according to a component selection condition through a principal component analysis, and wherein the component selection condition includes:

a threshold condition that with a given threshold, if an absolute value of a coefficient of a component is greater than the threshold, the component is retained, otherwise, if an absolute value of a coefficient of a component is less than the threshold, the component is deleted, and a quantity condition that with a given quantity for selection, components that satisfy the quantity are selected according to a descending order of coefficients of the components.

8. The operation method of claim 7, wherein the input data or the parameter matrix are presented by a linear combination of a basis vector of the second geometric space through spatial transformation.

9. The operation method of claim 7, wherein the input data and the parameter matrix are input data and a parameter matrix used by a convolutional layer, a down-sampling layer, a normalization layer, or a regularization layer.

10. The operation method of claim 7, wherein the first geometric space is a spatial domain, and the second geometric space is a frequency domain, and wherein a manner of the spatial transformation is an invertible spatial transformation including FFT, DFT, DCT, or DST.

11. The operation method of claim 7, wherein the performing operations on the transformed input data and parameter matrix includes:

obtaining a linear combination representation of the parameter matrix in the second geometric space according to the obtained transformed parameter matrix, wherein the linear combination representation indicates that the parameter matrix is represented by a linear combination of a space basis vector of the second geometric space, and coupling and operating the spatially transformed input data and the space basis vector.

12. The operation method of claim 7, wherein the performing operations on the transformed input data and parameter matrix includes: multiplication, addition, multiply-add operations, inner product operations, non-linear operations, or convolution operations.

13. The operation method of claim 7, wherein the performing operations on the transformed input data and parameter matrix further includes: activation function operations or pooling operations.

14. An electronic device, comprising:

an operation device that includes:

a transformation circuit configured to perform spatial transformation on input data and/or a parameter matrix from first geometric space into second geometric space; and an operation circuit connected to the transformation circuit and configured to receive transformed input data and parameter matrix, and then perform operations, wherein the operation device further includes an optimization circuit configured to perform optimization operation on transformed input data and/or a parameter matrix, wherein the optimization operation includes component selection, quantifying, sparsification, or compressing, wherein the optimization circuit performs component selection according to a component selection condition through a principal component analysis, and wherein the component selection condition includes:

a threshold condition that with a given threshold, if an absolute value of a coefficient of a component is greater than the threshold, the component is retained, otherwise, if an absolute value of a coefficient of a component is less than the threshold, the component is deleted, and a quantity condition that with a given quantity for selection, components that satisfy the quantity are selected according to a descending order of coefficients of the components.

15. The electronic device of claim 14, wherein the operation device further includes:

a multiplier configured to multiply data that are input into the multiplier to obtain output after multiplication, and one or a plurality of adders configured to add data that are input into the adders to obtain output data.

16. The electronic device of claim 15, wherein the operation circuit further includes an activation function circuit configured to perform activation function operations on data that are input into the activation function circuit to obtain activated output data, wherein an activation function includes sigmoid, tanh, ReLU, or softmax.

\* \* \* \* \*